United States Patent [19]

West

[11] Patent Number: 4,512,469
[45] Date of Patent: Apr. 23, 1985

[54] STORAGE RECEPTACLE FOR ELECTRONIC STORAGE MEDIA

[76] Inventor: Chester R. West, 1604 Sunburst La., Pineville, La. 71360

[21] Appl. No.: 501,259

[22] Filed: Jun. 6, 1983

[51] Int. Cl.$^3$ ............................................ B65D 85/672
[52] U.S. Cl. ...................................... 206/387; 16/359; 16/360; 16/361; 16/386; 220/23.4; 220/333
[58] Field of Search ................ 206/387, 497; 220/333, 220/337, 23.4; 312/9, 13, 14; 16/358-361, 386, DIG. 29

[56] References Cited

U.S. PATENT DOCUMENTS

| | | | |
|---|---|---|---|
| 967,230 | 8/1910 | Packer | 16/358 |
| 4,119,195 | 10/1978 | Widener | 206/387 |
| 4,253,568 | 3/1981 | Long et al. | 206/387 |
| 4,418,805 | 12/1983 | Wolff | 16/359 |

FOREIGN PATENT DOCUMENTS

| | | | |
|---|---|---|---|
| 2207417 | 8/1973 | Fed. Rep. of Germany | 206/387 |
| 50362A | 3/1982 | Japan | 206/387 |
| 50363A | 3/1982 | Japan | 206/387 |
| 629441 | 4/1982 | Switzerland | 206/387 |
| 795864 | 6/1958 | United Kingdom | 16/358 |
| 1586160 | 3/1981 | United Kingdom | 206/497 |

Primary Examiner—George E. Lowrance
Assistant Examiner—Jimmy G. Foster
Attorney, Agent, or Firm—Bode & Smith

[57] ABSTRACT

A compact storage receptacle for magnetic tapes, computer disks, phono records and other electronic storage media having a containerized housing with spaced apart, parallel side walls, which space between the walls defines a storage section for the tape or disk to be stored. Further provided is a secondary storage component wherein the actual tape or the like to be stored is inserted thereinto, wherein the secondary component is mounted by two pin and track combinations and rotatable up into the primary storage bin. There is further provisions for rotation of the secondary unit for locking and sealing. Likewise, a plurality of dove tailed tracks are provided along the side and back walls of each individualized compartment thus providing interconnections between individualized units into a compartmentalized system. Other features provided are a removable handle for easy caring of the storage unit, replaceable parts, a slot which allows insertion of a label for quick identification of the tape in the storage receptacle, and a seal which helps to keep the tape safe from contamination by dust or water.

3 Claims, 5 Drawing Figures

U.S. Patent  Apr. 23, 1985  4,512,469
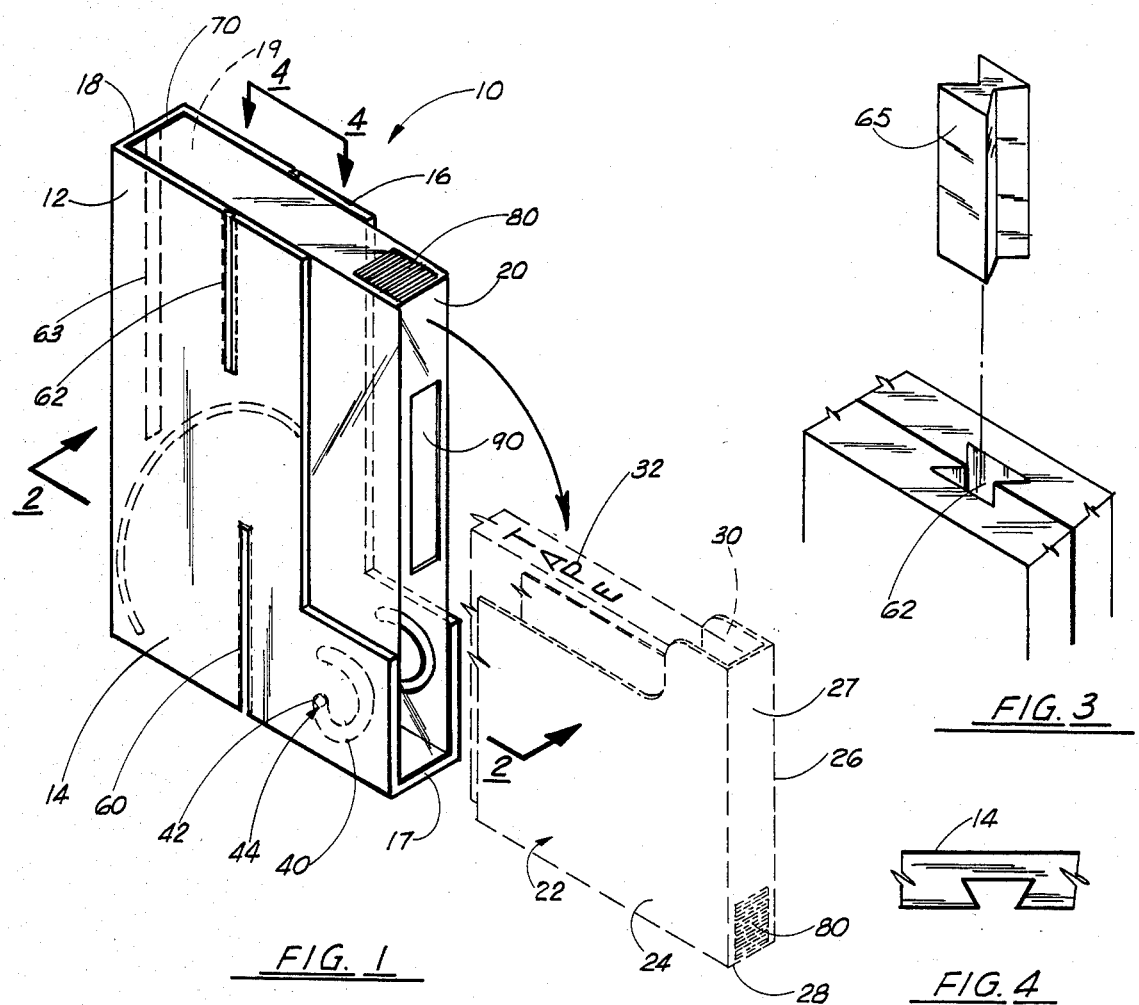
FIG. 1
FIG. 3
FIG. 4
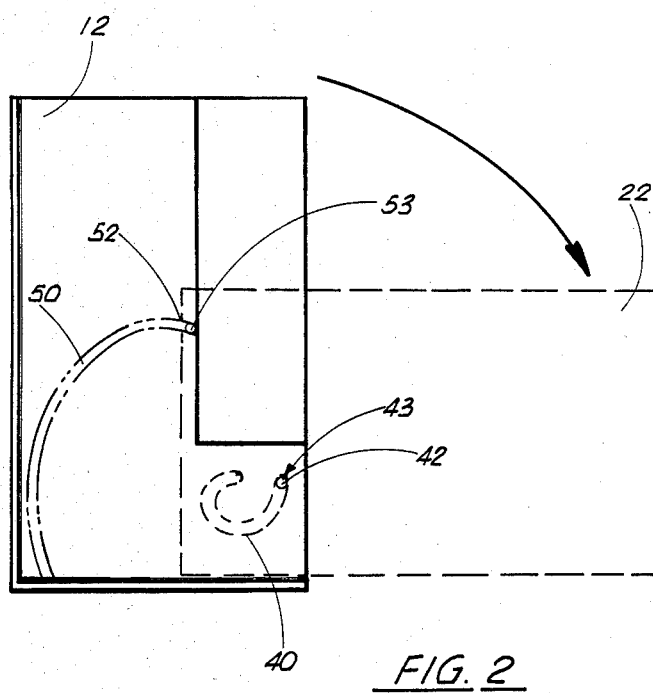
FIG. 2
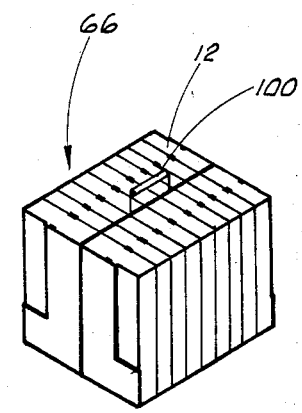
FIG. 5

STORAGE RECEPTACLE FOR ELECTRONIC STORAGE MEDIA

BACKGROUND OF THE INVENTION

1. Field of the Invention

The present invention relates to storage receptacles. In particular, the apparatus of the present invention relates to a storage receptacle for magnetic tapes, computer disks, and other electronic storage media wherein individual items are stored in a plurality of interconnected sealed storage receptacles.

2. General Background

In the field of storage and carrying of magnetic tape, computer disks, phono records, and other electronic storage media, it is often the case that such electronic media, in particular magnetic tapes, have to be carried in individual units, with each individual tape being supported in its own individualized container. Often, each separate container requires a door panel or the like or locking mechanism or protrusion for maintaining the tape in position. Such individual containers, oftentimes, although maintaining the tape in a protected container, allow for misplacement, contamination, and possible breakage of the tape due to the fact that the individual tapes are not protected as a self-contained unit as a whole.

Therefore, it would be advantageous to have available a receptacle for storage of magnetic tapes, and other electronic storage media wherein the tapes are easily available to the user on an individual basis, without having to utilize locking means for access thereto, yet contained as a plurality of receptacles in a containerized set, therefore reducing the possibility to a very bare minimum of the individual tapes having exposure to breakage, contamination, or being lost, and, at the same time, providing a convenient strong storage system where each tape is labeled and in minimized size and space maintained, as a unit available for the user.

Several patents have been issued regarding this subject matter, the most pertinent being as followed:

U.S. Pat. No. 3,909,088 issued to Dennehey et. al., entitled "Cassette Receptacle and Storage Apparatus" teaches the use of a rectangular container which is pivotally mounted to a housing for swinging relative to the housing about an axis extending through a corner of the casing and through ends of the horizontal portions of the side wall of the housing.

U.S. Pat. No. 4,067,626 issued to Amatsu et. al. entitled "Storage Receptacle for Magnetic Tape Cassette" teaches the use of a receptacle for magnetic tapes wherein the housing of the tape pivots outwardly. This patent also includes means within the holder to prevent the tape within the cassette from unreeling while in storage.

U.S. Pat. No. 4,253,568 issued to Long et. al. entitled "Video Cassette Container" also shows a cassette holder with a container means wherein the front portion of the holder pivots away and down in order to expose the stored tape.

U.S. Pat. No. 3,627,398 issued to Reese entitled "Apparatus for Storage of Objects Such As Tape Cassettes Enabling Easier Removal Thereof" discloses an apparatus which can be placed on the dashboard or the like of an automobile and by simple rotation of the container about the frame, exposes a multiple storage of tapes.

U.S. Pat. No. 3,858,720 issued to Flagler entitled "Curriculum Container Assembly" teaches the use of container for housing a tray for storage of materials in addition to the storage of a cassette tape.

GENERAL DISCUSSION OF THE PRESENT INVENTION

The apparatus of the present invention would improve on the present state of the art in a simple and straightforward manner. What is provided is a compact storage receptacle for magnetic tapes, computer disks, phono records and other electronic storage media having a containerized housing with spaced apart, parallel side walls, which space between the walls defines a storage section for the tape or disk to be stored. Further provided is a secondary storage component wherein the actual tape or the like to be stored is inserted thereinto, wherein the secondary component is mounted by means of two pin and track combinations and rotatable up into the primary storage bin. There is further provided a means for providing rotation of the secondary unit for locking and sealing. Likewise, a plurality of dove tailed tracks are provided along the side and back walls of each individualized compartment thus providing means to interconnect individualized units into a compartmentalized system. Other features provided are a removable handle for easy caring of the storage unit, replaceable parts, a slot which allows insertion of a label for quick identification of the tape in the storage receptacle, and a seal which helps to keep the tape safe from contamination by dust or water. Also, due to the mounting of the secondary case, the secondary case is protected against breakage by overextension and is also resistant to breakage from any side force applied to the secondary case.

Therefore, it is an object of the present invention to provide a storage receptacle for magnetic tapes and the like wherein the user has easy knowable access thereto.

It is a further object of the present invention to provide storage receptacles for electronic media wherein the unique pin and track combinations of the tape compartment negates the need for locking and inadvertant opening of the container.

It is still a further object of the present invention to provide receptacles for electronic storage media wherein the individualized receptacles can be integrated into a single storage media system.

In order to achieve the desired objects of the present invention, it is a feature of the present invention to provide a receptacle for electronic storage media having a first based storage container and a pin and track mounted secondary container for access to the tape to be stored.

It is a further feature of the present invention to provide a receptacle for electronic storage media wherein the secondary storage container is uniquely double pivotally mounted for access and self-locking and sealing features.

It is still a further feature of the present invention to provide means on each storage receptacle which allow interconnection between individual receptacles for the formation of a storage system as a single unit.

BRIEF DESCRIPTION OF THE DRAWINGS

For a further understanding of the nature and objects of the present invention, reference should be had to the following detailed description, taken in conjunction with the accompanying drawings, in which like parts are given like reference numerals and, wherein:

FIG. 1 is a overall perspective view of the preferred embodiment of the apparatus of the present invention illustrating the receptacle moving between closed and open positions;

FIG. 2 is a side view of the preferred embodiment of the apparatus of the present invention illustrating movement of the apparatus between open and closed positions;

FIG. 3 is a partial perspective view illustrating the system for interconnecting individualized units in the preferred embodiment of the apparatus of the present invention;

FIG. 4 is a top partial view of the interconnector channel of an apparatus of the present invention; and FIG. 5 is an overall perspective view of a plurality of individual receptacles interconnected to form a container system with carrying handle.

DETAILED DESCRIPTION OF THE PREFERRED EMBODIMENT

FIGS. 1 through 5 illustrate the preferred embodiment of the apparatus of the present invention by the numeral 10. Apparatus 10, in the preferred embodiment would comprise primary storage container 12 which further comprises a pair or substantially parallel side walls 14 and 16, with floor portion 17 and back portion 18 intermediate said side walls 14 and 16, the space 19 contained therebetween defining a primary storage chamber. In the preferred embodiment, primary container 12 would be open-ended at its face portion 20, the reason to be further explained.

There is further provided, in the preferred embodiment secondary storage container 22, like primary container 12 also as a pair of side walls 24 and 26, which are substantially parallel, spaced apart by top portion 27 and face wall 28.

In combination, secondary container 22 would define a space 30 between side walls 24 and 26 wherein a tape 32 or the like could be inserted rather snugly therein. Of course, the FIGURES having illustrated only the use of a tape or the like within container 22, the containers could be of various sizes, shapes and widths for containing other sized and configurated storage disks, such as floppy disks, or the like. For purposes of the explanation, we shall utilize a typical magnetic tape such as a cassette or the like.

Tape 32 having been inserted into a storage container 22, as seen in FIG. 1, Further, side walls 24 and 26 provide a cut-away portion of each side wall 24 and 26 so that access could be had easily to tape 32 in removal thereof, and replacement thereinto.

As seen in FIG. 2, secondary storage unit 22 is housed within primary storage unit 12, with the exterior width of secondary unit 22 being of substantially equal width as space 19 between side walls 14 and 16, thus enabling snug yet easy movement secondary storage 22 from an opened to a closed position as illustrated in FIGS. 1 and 2 by arrow 38. As illustrated in FIG. 2, secondary storage unit 22 is rotatably mounted to outer container 12 via a pair of mounting means. There is first provided mounting/track means 40, which comprises a track molded into each of side walls 24, the track defining a space for accommodating peg 42 on walls 14 and 16. As seen in FIG. 2, in phantom view, in the opened position, peg 42 is contained in track 40 at point 43. As seen in phantom view in FIG. 1, peg 42 is contained in track 40 at point 44 when secondary unit 22 is in the closed position. This unique rotation of track 40 from the opened to the closed position further provides a means for locking apparatus 10 in a closed position. Track 40 moves into the closed position automatically due to the shape of tract 40 and the inward slope (nearest the base), at the end of track 50.

As a further means of facilitating the ease of opening and closing secondary storage bin 22, there is further provided track means 50, again, wherein a track or the like is provided within side walls 14 and 16 of primary storage container 12, and wherein a second peg 52 contained on the wall of secondary storage bin 22, moves from the closed position wherein peg 52 is at the lowermost point of track 50, to the opened position wherein peg 52 has run along track 50 into the uppermost position of track 52. This particular secondary opening means further provides a stop means 53 to prevent secondary CONTAINER 22 from opening beyond that point as illustrated in phantom view in FIG. 2. Also, the base of primary storage container 12 gives support to secondary storage container 22 when secondary container 22 is rotated to the opened position.

An important aspect of novelty in this particular apparatus is illustrated in FIGS. 3 through 5. Initially, referring again to FIG. 1, there is seen in side wall 14 in that particular view, tracks 60 and 62 on side wall 14 and 16 respectively and track 63 on back wall 18. These particular tracks are better defined in FIGS. 3 and 4. As is seen in those FIGURES, track 60, 62 and 63 are dove-tailed type tracks tracks constructed into the wall of 14, 18 or 16 of apparatus 10, which functions as a typical dove-tailed track in that a dove-tailed shaped locking means 65 is inserted thereto and cannot be removed unless slid upwardly as seen in FIG. 3. In utilizing this particular feature, a pair of or a plurality of storage units 12, as seen in FIG. 5, could be positioned so that dove tail tracks 60, 62 are aligned as seen in FIG. 3. Following the alignment of dove tailed tracks 60 and 62 or dove-tailed track 63, there is inserted locking member 65 thereinto thus forming a pair or more of individualized units 10, locked together via locking means 65 to form a unit 66 as seen in FIG. 5. In this particular configuration, the individual tapes or the like contained in individual storage units 10 would be contained in a system 66, wherein the entire system could be located at a convenient place for obtaining individual tapes yet maintaining the structural integrity of the system rather than the individual units having their week individual structural components.

As seen in FIG. 1, sealing material 70 around the edges or primary container 12 serve to seal secondary container 22 when secondary container 22 is in the closed position, therefore protecting the electronic storage media within from contamination by dirt or moisture.

Elevated ridges 80 on secondary container 22, as seen in FIG. 1 provide a gripping means for fingers so that secondary container 22 may be easily opened and closed.

Slot 90 provided on secondary container 22, as seen in FIG. 1, has one open end and is transparent so that labels for identification of the electronic media stored in apparatus 10 may be identified.

As seen in FIG. 5, a removable carrying handle 100 is provided so that apparatus 10 may be conveniently carried.

As seen in the specification, apparatus 10 provides a strong compact unit resistant to breakage, a unit conveniently carried through the use of removable handle 100, a unit easily maintained through the use of replaceable parts, a unit which allows quick identification of tapes stored in apparatus 10, and a unit which is sealable to protect stored tapes from contamination by dust and moisture.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. A media storage container, which comprises:
    a. a primary container having a pair of substantially parallel side walls, a back wall and an open-ended front portion for defining a container space therein;
    b. a secondary container means pivotally moveable from an open to a closed position within said space of said primary container, said secondary container having substantially side parallel walls and an open-ended back wall for defining a media storage tape container space therein;
    c. double track means, allowing said pivotal movement of said secondary container within said space of said primary container, said double track means further comprising;
        i. an arcuate slot cut into the wall of said primary container having its lower portion sloped toward said open-ended front portion of said primary container;
        ii. a peg member contained on the wall of said secondary container, said peg member matingly slideable within said slot, as said secondary container changes positions;
        iii. a second eccentric semi-circular track cut into the wall of said secondary container and having its open end facing said arcuate slot when said secondary container is in said closed position;
        iv. a second peg member positioned on the wall of said primary container accommodated in said second eccentric track as said secondary container moves from opened to closed position;
        v. said first peg matingly engaged in said first slot and said second peg matingly engaged in said second eccentric track, together providing said means to move said secondary container from opened to closed positions within said primary container; and
    d. means for locking said container in a closed position comprising the rotatable positioning of the open end of said arcuate track on said second peg, effected by the slideable engagement of said first peg member to the lower portion of said arcuate slot.

2. A cassette tape container, which comprises:
    a. a primary container having a pair of substantially parallel side walls, a back wall and an open-ended front portion defined by the upper and forward edges of said container for defining a container space therein;
    b. a secondary container means pivotally moveable from an open to a closed position within said space of said primary container, said secondary container having substantially side parallel walls and a open-ended back wall for defining a cassette tape container space therein;
    c. double track means for allowing said pivotal movement of said secondary container within said space of said primary container comprising:
        i. at least one arcuate slot cut into the wall of said primary container having its lower portion sloped toward said open ended front portion of said primary container;
        ii. a first peg member positioned on the wall of said secondary container and matingly slideable within said arcuate slot as said secondary container moves between said open and closed positions;
        iii. a second eccentric semi-circular track cut into the wall of said second container and having its open end facing said arcuate slot when said secondary container is in said closed position;
        iv. a second peg member positioned on the wall of said primary container accommodated in said second eccentric track as said secondary container moves between said open and closed positions;
        v. means for locking said container in a closed position comprising the rotatable positioning of the the open end of said arcuate track on said second peg, effected by the slideable engagement of said first peg member into the lower portion of said arcuate slot;
    d. means for interconnecting individual containers wherein said containers comprise a plurality of tape containers defining a multi-containerized stoage system; and
    e. means for sealing said tape container from contaminants.

3. The apparatus in claim 2, wherein said sealing means comprises a resilient material around the upper edges of said primary container so that said resilient material engages with said secondary container, when said secondary container is placed in the closed position.

* * * * *